May 1, 1928.
E. W. DODGE
1,668,268
AUTOMATIC GAS CONTROLLING STANDING VALVE
Filed Dec. 20, 1926
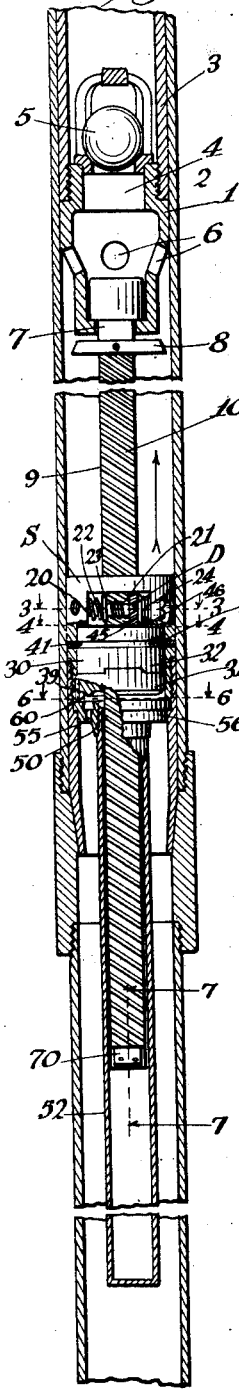
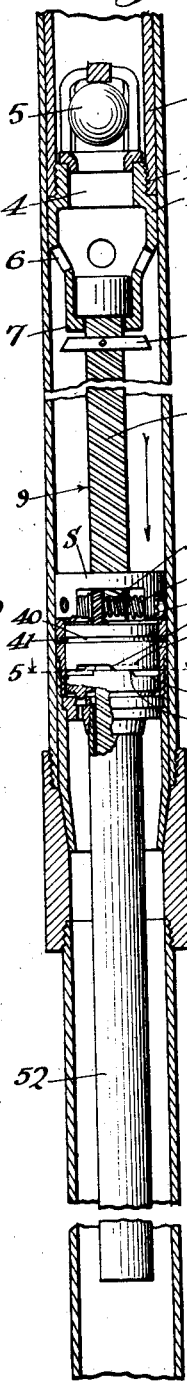
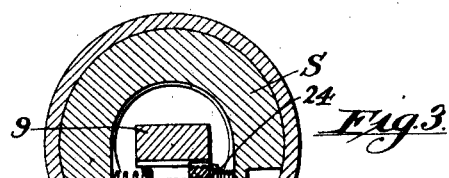
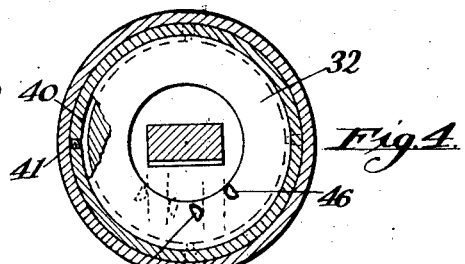
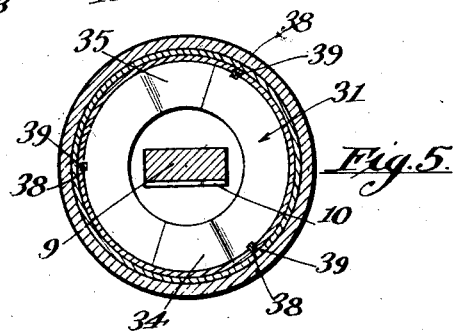
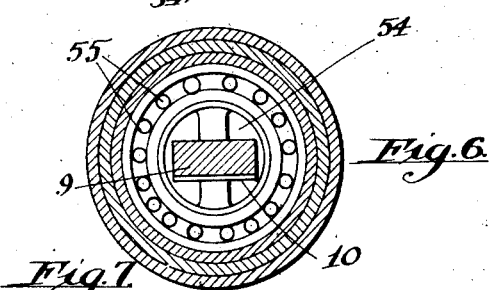
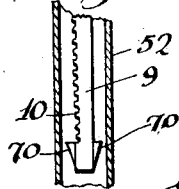
Inventor
Eugene W. Dodge.
by Hazard and Miller
Attorneys Patented May 1, 1928.

1,668,268

UNITED STATES PATENT OFFICE.

EUGENE W. DODGE, OF LONG BEACH, CALIFORNIA.

AUTOMATIC GAS-CONTROLLING STANDING VALVE.

Application filed December 20, 1926. Serial No. 155,980.

This invention relates to automatic gas controlling standing valves for use in deep well construction, either oil or artesian.

An object of this invention is to provide a valve which will close mechanically, thereby preventing the fluid being pumped from running back of the same before the pump picks it up.

Another object of this invention is to provide a standing valve which will increase the life of sucker rods and which will not have a tendency to cause them to part by breaking.

A further object of this invention is to provide a standing valve which will not ball up or sand up by virtue of the fact that the liquid is kept in a continuous state of agitation so that no sand or solid substance can settle or pack around the valve.

A further object of this invention is to provide a standing valve which eliminates the use of a gas anchor, which anchor usually excludes the major portion of the gas from the tubing and makes the lift very heavy, often calling for heavy counterbalances which offset the weight of the fluid and rods.

A still further object of this invention is to provide a standing valve which is comparatively simple in its construction, which is not likely to get out of order and which is well adapted to perform the service to which it is put.

With the foregoing and other objects in view which will be made manifest in the following detailed description and specifically pointed out in the appended claims, reference is had to the accompanying drawings for an illustrative embodiment of the invention, wherein:

Figure 1 is a sectional view of the operative parts of my invention shown in assembled relation in actual use when the plunger is in the process of making its upward stroke showing the standing valve closed, Fig. 2 is a similar sectional view showing the operative parts of my invention in assembled relation in actual use in an oil well when the plunger is in the process of making its downward stroke, Fig. 3 is a sectional view taken along the line 3—3 of Fig. 1, Fig. 4 is a similar sectional view taken along the line 4—4 of Fig. 1, Fig. 5 is a sectional view taken along the line 5—5 of Fig. 2, Fig. 6 is a sectional view taken along the line 6—6 of Fig. 1, and Fig. 7 is a sectional view taken longitudinally of the well along the line 7—7 of Fig. 1.

Referring to the accompanying drawings wherein similar reference characters designate similar parts throughout, the reference numeral 1 designates a plunger bushing which is threaded as at 2 to the bottom of the plunger 3. This bushing has a valve seat or recess 4 in which is seated a ball 5. A plurality of apertures 6 extend through the side of this bushing and permit fluid and gas to pass upwardly through the same past the ball and seat and into the plunger. The lower end of the bushing is provided with a swivel joint 7, which swivel prevents any torsional strain on any part of the standing valve. A bumping plate is shown at 8, which plate is adapted to seat the standing valve securely in its shoe, when the weight of the rods and plunger is set upon the same. An elongated flat rack which is oblong in shape is designated at 9. This rack will of course vary in length, but in the ordinary type of oil well it will be about 12 feet long when the well is pumping with the average length of stroke. This rod works the mechanism of the valve, unseats it when the plunger is pulled out of the pump, and also acts as an agitator to keep sand or other solid matter from settling around the valve.

A series of inclined teeth 10 are arranged along the full length of the rack. The teeth 10 mesh with a gear wheel D, which wheel forms an operative part of my standing valve. The wheel D is loosely mounted upon a shaft 20 and is threaded interiorly. The central portion of the shaft 20 is provided with a worm thread 21. When the rack 10 moves upwardly as the plunger is making its upward stroke, the wheel D is rotated and the same engages the worm. This engagement is a forced engagement, such action being caused by the coil spring 22 and washer 23 on the left of the shaft 20. The wheel thus rotated travels quickly to the right and releases its engagement with the worm thread 21 compressing the spring 24 on the right of the shaft and in this position the wheel runs idle, being disengaged from the worm thread until the plunger reaches the top of its stroke. The shaft 20 is threadedly mounted in a shell S which is in turn mounted in the working barrel of the pump.

When the plunger commences its downward stroke, the reverse operation takes place. The gear being rotated in the opposite direction is engaged by the worm thread 21, travels quickly across the same to the left, compresses the coil spring 22 and idles on the smooth bearing of the shaft.

The gear D operates my standing valve. This valve comprises a pair of annular cam plates 30 and 31 provided with cam surfaces 32. These plates are arranged in superimposed relation and the opposing surfaces of the same are complementary. The lower surface of the upper plate 30 is provided with a cut-out portion 33, while the upper surface of the lower plate is provided with a complementary projection 34 adapted to seat in the depression 33. A reverse projection 35 is formed on the lower surface of the upper plate 30 and a corresponding depression 36 is formed on the upper surface of the lower plate 31, which projection and depression are similarly adapted to seat one within the other. The lower plate is slidable longitudinally of the well by means of the slots 38 formed in the valve sleeve as shown in Fig. 5 and the keys 39. These slots and keys permit a slight longitudinal displacement of the lower plate 31. The upper plate 30 is slidable in the valve sleeve annularly. Toward this end an annular groove 40 is provided on the circumference of the same, and a pair of inwardly extending projections 41 engage this groove to prevent longitudinal displacement of the plate, while at the same time permitting rotation of the same. A pair of projections 45 and 46 engage the gear D and as the same race across the worm 21 on the shaft 20, the marginal portion of the upper plate is carried with the same, thereby permitting a small amount of annular rotation of the plate 30. A disc 56 is seated in the lower half of the shell, and when the upper half is screwed on the same, it is firmly locked in place. Apertures 55 are formed in the disc. The apertures 55 form valve seats, and the lower edge of the lower plate 31 is provided with a plurality of lugs 60, which seat in the apertures 55. Fitted to the disc 56 as by threads 50, is a closed section of pipe 52, which pipe serves as a sheath for the lower end of the rack 10. This pipe additionally prevents leakage of gas or fluid around the rack through the opening shown in Figure 6 and designated at 54. The liquid flows around this closed pipe section and upwardly through the apertures 55. The lower end of the rack 10 is provided with shoulders 70 which are riveted to the same, which shoulders serve to remove the operative parts of the standing valve from the well when removal of the same is desired.

The operation of my device is as follows: When the plunger is making its upward stroke, the ball 5 is seated and liquid above the same is forced upwardly. As the rack 10 moves upwardly, the gear D assumes a position on the right of the shaft 20 and idles thereon. The upper plate 30 is thereby rotated to the right and the lower plate 31 assumes the position shown in Fig. 1, thereby permitting gas and fluid to pass through the apertures 55 and fill the space between the ball 5 and the seat 4 and the standing valve. When the plunger is making its downward stroke, the gear D travels across the shaft and rotates idly on the other side of the same. The upper plate 30 is rotated to the left. The cam surfaces 32 force the lower plate 31 downwardly, thereby closing the apertures 55 and preventing gas and fluid from re-entering the apertures and traveling downwardly into the well.

As the plunger makes its up-stroke as shown in Figure 1, the ball 5 automatically seats on the valve seat and no fluid is permitted to pass downwardly beyond the same. The fluid above the same is forced upwardly and the complementary surfaces on the members 31 and 32 are in register so that the projections 60 leave the apertures 55 free. The member 31 is free to move upwardly due to suction in the pump. The fluid thus enters the apertures 55 and passes through the space in the members 31 and 32 between the rack 10 into the space above the standing valve. As the plunger moves downwardly, the ball 5 unseats, and the complementary surfaces on the members 31 and 32 are thrown out of register so that the projections 60 positively seat upon the apertures 55 and prevent downward movement of fluid through the standing valve. The fluid in the space between the ball and standing valve thus is forced outwardly through the apertures 6 and past the ball 5. The next movement of the plunger will be upwardly, and thus a repetition of this operation is performed.

From this description of the working of my standing valve, it will be seen that I have provided one which is durable and unlikely to get out of order, and which adequately performs the services required of it. The standing valve of course, is adapted to replace the conventional type of standing valve, but the principle of its operation when taken in connection with the traveling valve is the same. As this last mentioned valve is seated, the standing valve is opened and fluid is permitted to pass through the same, and as the traveling valve is opened, the standing valve is closed, preventing downward movement of fluid through the same.

It will be understood that various changes may be made in the detail of construction without departing from the spirit and scope of the invention as defined by the appended claims.

I claim:

1. In an automatic gas controlling standing valve, a valve plate having an aperture therethrough, a pair of superimposed plates above said valve plate, a lug on the lower of said plates adapted to close said aperture, cam surfaces on said plates, said surfaces being in engagement, the lower plate being movable vertically, means for rotating said upper plate whereby said cam surfaces will force said lower plate downwardly, thereby closing said aperture.

2. A device of the character described, comprising a stationary valve plate having an aperture therethrough, a plate above said stationary plate having a projection thereon, said plate being movable vertically, a third plate mounted for rotation above said second plate and in a plane parallel thereto, said last two mentioned plates having opposing cam surfaces whereby rotation of said last mentioned plate will cause downward movement of said second mentioned plate for the purpose specified, and means for causing rotational movement of said last mentioned plate.

3. A device of the character described, comprising a stationary valve plate having an aperture therethrough, a plate having a projection thereon movable vertically above said first mentioned plate, a third plate above said second mentioned plate, said third plate being mounted for rotation above said second mentioned plate, a shell above said last mentioned plate, a shaft mounted for rotation on said shell, a toothed gear movable axially on said shaft and mounted for rotation thereon, a toothed rack engaging said toothed gear and adapted to move in a vertical direction, means whereby movement of said toothed rack will cause longitudinal movement of said toothed gear on said shaft, said toothed gear having engagement with said last mentioned plate to rotate the same and cause downward movement of said second mentioned plate for the purpose specified.

4. The combination with a pump for deep oil wells and the like having a working barrel and a plunger, of a bushing threaded to said plunger, a ball valve associated with said bushing, a toothed rack swiveled to said bushing, a shell mounted in said working barrel, a shaft having a central worm thereon threadedly mounted in said shell, a toothed gear interiorly threaded, rotatable on said shaft, said toothed gear engaging said rack to be rotated by the same, threads on said shaft engaging the interior threads on said gear, a pair of superimposed plates, one of which is rotatably mounted below the shell, means on said plate engaging said toothed gear whereby said plate may be rotated, the other of said plates being slidable longitudinally of the working barrel, said plates presenting opposing cam surfaces, a lug formed on an edge of said plates, a valve plate rigid with said working barrel and adjacent said plate bearing the lug, said valve plate having an aperture therethrough adapted to be closed by said lug for the purpose specified.

5. A device of the character described, comprising a stationary valve plate, a pair of superimposed plates adjacent said stationary plate, one of said superimposed plates being movable vertically, and the other of said plates being movable for rotation about a vertical axis, opposing cam surfaces on said plates, a shell, a shaft mounted in said shell, a toothed gear on said shaft mounted for rotation on the same, interior threads on said toothed gear, threads on said shaft, a rack movable vertically, having teeth thereon, engaging said toothed gear to rotate the same, said toothed gear engaging said plate which is movable for rotation about a vertical axis, to rotate the same as and for the purpose specified.

6. A standing valve for deep wells, comprising a valve plate having an aperture therethrough, a second plate adjacent said first mentioned plate having a projection thereon adapted to close said aperture, said second plate being movable there being openings through both of said plates, an elongated rack extending through said openings, means operable by movement of said rack for moving said second plate to cause said projection to open said aperture.

7. A standing valve for deep wells, comprising a valve plate having an aperture therethrough, a second plate adjacent said first mentioned plate having a projection thereon adapted to close said aperture, said second plate being movable, there being openings through both of said plates, an elongated rack extending through said openings, means operable by movement of said rack for moving said second plate to cause said projection to open said aperture, and means on the lower end of said rack for removing said plates from the well.

8. In a standing valve for oil wells, a valve seat, a plate vertically movable above said valve seat, a lug on said plate, a cam on said plate, a second plate mounted for rotary movement, a cam on said second plate adapted to engage said first mentioned cam when rotated, to force said lug into said seat to close the valve, and automatic means for rotating said second plate.

9. A device of the character described comprising a stationary valve plate having an aperture therethrough, a plate having a projection thereon and movable vertically above said first mentioned plate, a third plate above said second mentioned plate and mounted for rotation about a vertical axis, a shell above said last mentioned plate, a shaft rotatably mounted upon said shell, a toothed gear mounted for axial and rotary movement on said shaft, a toothed rack engaging said gear, and means whereby movement of said rack will cause resilient movement of said gear on said shaft, said gear having an engagement with said last mentioned plate to rotate the same and cause downward movement of said second mentioned plate for the purpose specified.

10. A standing valve for deep wells, comprising a stationary valve plate having a seat therein, a movable plate having a projection thereon adapted to close said seat, a rack extending through apertures in both of said plates, and means operable by movement of said rack for resiliently moving said second plate to cause the projection to open the seat.

In testimony whereof I have signed my name to this specification.

EUGENE W. DODGE.